W. S. CRUM.
SANITARY STOCK TANK.
APPLICATION FILED DEC. 6, 1913.
1,136,510.
Patented Apr. 20, 1915.
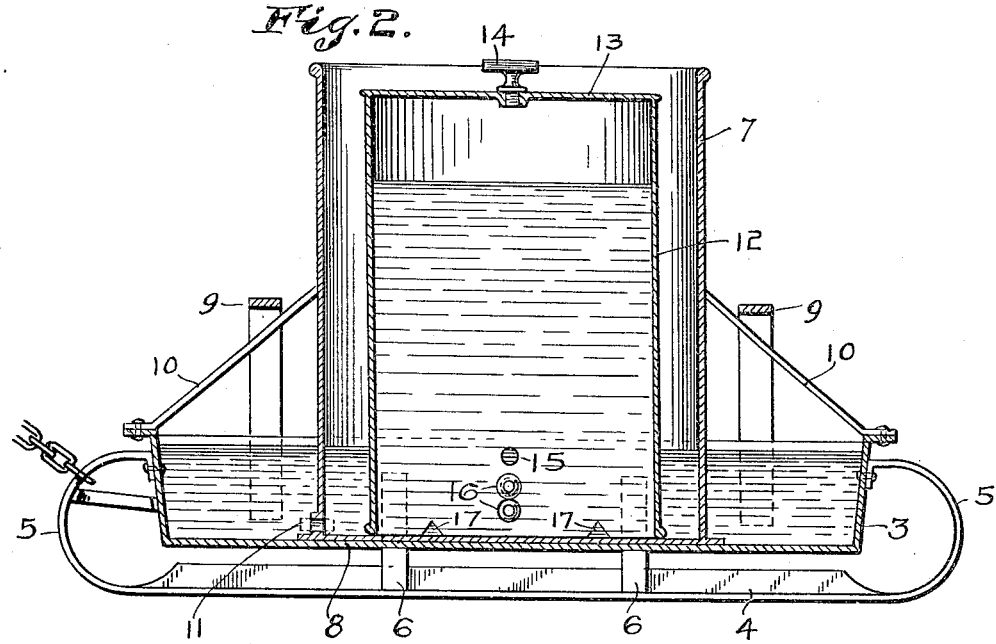
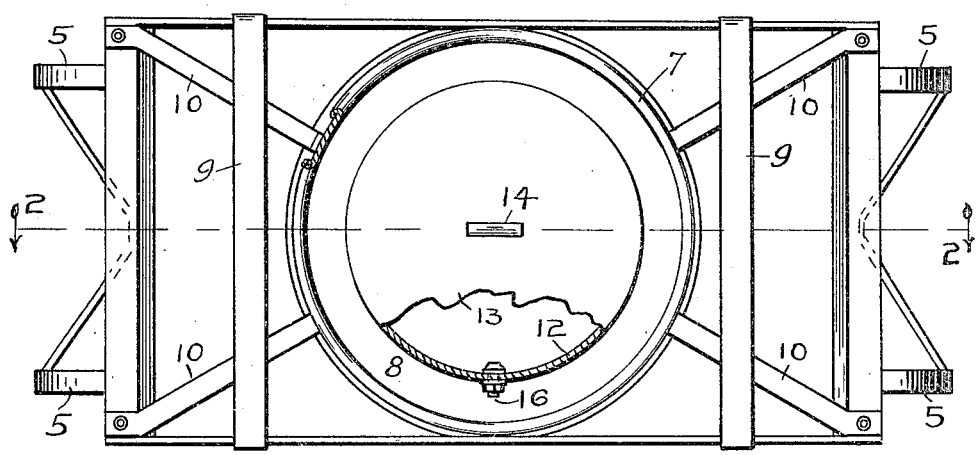
WITNESSES:
L. B. Woerner
I. L. Larson
INVENTOR:
Winfield S. Crum,
By Minturn & Woerner,
Attorneys.

UNITED STATES PATENT OFFICE.

WINFIELD S. CRUM, OF WILKINSON, INDIANA.

SANITARY STOCK-TANK.

1,136,510.  Specification of Letters Patent.  Patented Apr. 20, 1915.

Application filed December 6, 1913. Serial No. 805,147.

*To all whom it may concern:*

Be it known that I, WINFIELD S. CRUM, a citizen of the United States, residing at Wilkinson, in the county of Hancock and State of Indiana, have invented certain new and useful Improvements in Sanitary Stock-Tanks, of which the following is a specification.

This invention relates to improvements in automatic water supply troughs and tanks for watering live stock, and is an improvement on a device for the same purpose patented to me January 4, 1910, No. 945,706.

The object of this invention is to provide a double tank the inner one of which is bottomless in order to cheapen the cost of construction of the device and also to make the interior of the tank more accessible for cleaning purposes.

Another object of my invention is to provide a convenient means for filling said reservoir or supply tank, and to provide means for regulating the height of the water in the trough.

A further object of my invention is to provide a readily portable watering device of the above character, which will be properly braced in order to make it sufficiently strong to resist injury from the animals drinking from it, and to provide a mechanism which will be simple in its operation, inexpensive to construct and durable.

I accomplish the above objects and other objects which will hereinafter appear, by the mechanism illustrated by the accompanying drawing, in which—

Figure 1 is a top plan view of my invention showing minor portions broken away and sectioned, and Fig. 2 is a vertical section on the line 2—2 of Fig. 1.

Like characters of reference indicate like parts throughout the several views of the drawing.

The watering trough 3 is here shown as rectangular in shape, and is mounted upon a pair of sled-runners 4, here shown as formed out of angle iron, the vertical web of which at both ends of each runner is removed leaving the horizontal member of the runner which is bent upwardly and inwardly in curves 5, and riveted to the respective ends of the trough 3. The trough is suitably supported upon risers 6.

Located within the trough 3 at the middle portion of said trough is a tank 7, here shown as having cylindrical vertical walls and a horizontal bottom 8. The tank is open at its upper end. The trough 3 extends a suitable distance on two opposite sides of the tank 7 to provide water-holding receptacles out of which the animals drink. Injury to the tank by the struggles and impatience of the animals to reach the water is prevented by guard-bars 9 which are inverted U-shaped bars which are placed astride the trough, as shown, with their ends fastened to the sides of the trough.

The tank 7 is held in a fixed position in the trough by means of diagonal braces 10, here shown as four in number extending from each corner of the trough upwardly to the tank. The tank 7 is provided with one or more water outlets 11 at the bottom of the tank for the free discharge of water from its interior into the trough. This water outlet 11 may be closed, when desired, by means of a plug shown in dotted lines in Fig. 2.

Assembled within the tank 7, upon the bottom of said tank, is a reservoir tank 12. The tank 12 is considerably smaller in diameter than the tank 7 so as to afford free circulation of water between the vertical walls of it and said tank 7, and it has an air-tight closure or top 13. The opposite or lower end of the reservoir-tank 12 is open. The reservoir-tank 12 has an opening through its top. This is closed in an air-tight manner except when the tank is being filled by a cap having a handle 14 which handle is for convenience in lifting the tank in and out of the outer tank 7. The side walls of the reservoir tank 12 are provided with one or more water-discharge openings 15, here shown as three in number placed at different heights above the bottom of the tank 12. The highest one of these openings is below the upper line of the side of the trough 3 in order to prevent overflowing the trough when this top hole is open, and the other discharge holes or openings of said series are located at different distances, below said top opening. The discharge opening corresponding to the desired height of the water in the trough will be opened. The other openings above this one of said series will be closed by any suitable closing means that will make the wall water-tight at such times. The device which I preferably use for closing said openings is an ordinary stove-bolt 16, with suitable leather or rubber washers contacting the walls of the tank to make a water-tight joint. The walls of tank 12 have bottom notches 17 for the free flow of water.

The operation of my device is as follows: The tanks being empty, the first operation is to plug up the discharge openings 11 from tank 7, and then place the reservoir tank 12 in its inverted position within the tank 7. Then the plug which is a part of the handle 14 is removed from the tank 12 for the free escape of air within the tank and the tanks are filled by pouring water on top of tank 12 by the water passing down below the two tanks and from the bottom up in tank 12. The opening to atmosphere from the reservoir-tank 12 is then closed by replacing the cap attached to handle 14, and the water is allowed to issue from tank 7 into the watering trough through the hole 11 by the withdrawal of its plug. As soon as the water in tank 7 has reached the level of the highest hole 15, open in the wall of the reservoir tank 12, it will be maintained at that level by replenishment from the store of water in the tank 12. This operation will be carried on automatically and the pressure of the air upon the surface of the water in trough 3 will hold back the head of water in the tank 12 as long as the opening 15 in its side is covered by the water in the trough. By reason of the open lower end of the reservoir-tank 12 it is a very easy matter to lift it out and clean both it and the tank 7.

Having thus fully described my invention, what I claim as new and wish to secure by Letters Patent of the United States, is—

1. In a stock tank, a trough, a tank with a closed bottom and open top seated in said trough, said tank having a side opening, a reservoir-tank closed at the top and open at its lower end located within the first tank, said reservoir-tank having a water discharge-opening through its side into the first tank.

2. In a stock tank, a trough, a tank with a closed bottom and open top seated in said trough, said tank having a side opening, a reservoir-tank closed at the top and open at its lower end located within the first tank, said reservoir-tank having a vertical series of water discharge-openings through its side near its lower end into said first tank, and means for closing one or more of the openings of said series.

3. In a stock tank, a trough, a tank with a closed bottom and open top seated in said trough, said tank having a side opening, brace-rods connecting said tank with the walls of the trough to hold the tank in a fixed position of the trough, a reservoir-tank closed at the top and open at its lower end located within the first tank, said reservoir-tank having a water discharge-opening through its side into the first tank and means for varying the water level in the trough.

In witness whereof, I have hereunto set my hand and seal at Indianapolis, Indiana, this 24th day of October, A. D. one thousand nine hundred and thirteen.

WINFIELD S. CRUM. [L. S.]

Witnesses:
F. W. WOERNER,
L. B. WOERNER.

Copies of this patent may be obtained for five cents each, by addressing the "Commissioner of Patents, Washington, D. C."